Patented June 7, 1938

2,119,629

UNITED STATES PATENT OFFICE 2,119,629

CAOUTCHOUC-LIKE PRODUCTS AND A PROCESS OF PREPARING THEM

Ludwig van Zütphen, Frankfort-on-the-Main-Hochst, Germany, assignor to I. G. Farbenindustrie Aktiengesellschaft, Frankfort-on-the-Main, Germany No Drawing. Application May 7, 1935, Serial No. 20,209. In Germany May 9, 1934

2 Claims. (Cl. 260—6)

The present invention relates to caoutchouc-like products and to a process of preparing them.

As starting materials for the preparation of synthetic caoutchouc-like products there have hitherto solely been used hydrocarbons which are based upon the butadiene structure, no further unsaturated linkages being present in the molecule, for instance butadiene 1.3, isoprene, dimethyl-butadiene, 2-chlorobutadiene 1.3.

Now I have found that also the unsaturated chlorinated hydrocarbon with a long chain which is obtained by the addition of hydrochloric acid on vinyl-butadienyl-acetylene, i. e. which is a chlorinated butadiene with a long chain and constitutes a chloro-octotetraene of a constitution not yet exactly known, may be readily polymerized particularly, by the action of light, so as to obtain caoutchouc-like products.

The following example serves to illustrate the invention, but it is not intended to limit it thereto:

Monovinyl acetylene is introduced at a temperature between 50° C. and 60° C. into a solution of 500 grams of cuprous chloride, 600 grams of ammonium chloride, 40 grams copper powder, 50 grams of concentrated hydrochloric acid and 2 liters of water. The non-converted monovinyl acetylene is continuously reintroduced into the solution, while causing it to circulate; during this operation the vinyl-butadienyl-acetylene formed and carried along with the current of gas is condensed by an appropriate cooling. The pure compound thus obtained in a practically quantitative yield boils after having been dried with calcium chloride at a temperature between 43° C. and 45° C. and under a pressure of 11 mm.

Vinyl-butadienyl-acetylene to which anti-oxidizing agents, such as hydroquinone or pyrogallol, are advantageously added, is introduced at room temperature, while excluding oxidizing substances, for instance in a nitrogen atmosphere, into an actively agitated solution of concentrated hydrochloric acid and small catalytically active quantities of cuprous chloride and ammonium chloride. After a short time the addition of the hydrochloric acid is complete. The oil layer is separated and washed with water. The chloro-octotetraene formed is rectified by distilling it in a hydrogen atmosphere in the vacuum at a temperature of 50° C. and 60° C. and under a pressure of 2 mm.

By the action of light, heat or the known polymerization accelerators the compound polymerizes and a caoutchouc-like product is obtained which is of a crumbly consistency and a weakly yellow color and is sparingly soluble in the usual organic solvents.

I claim:

1. The process of preparing caoutchouc-like products which consists in subjecting to polymerization the compound produced by the addition of hydrochloric acid on vinyl-butadienyl-acetylene.

2. As a new product the polymerized addition product of vinyl-butadienyl-acetylene and hydrochloric acid, the polymerization product being a rubber-like substance of a crumbly consistency, a weakly yellow color and sparingly soluble in the usual organic solvents.

LUDWIG VAN ZÜTPHEN.